(No Model.)
T. F. HAMMER.
Machine for Boring and Tapping Pipe Bends.
No. 231,312.   Patented Aug. 17, 1880.
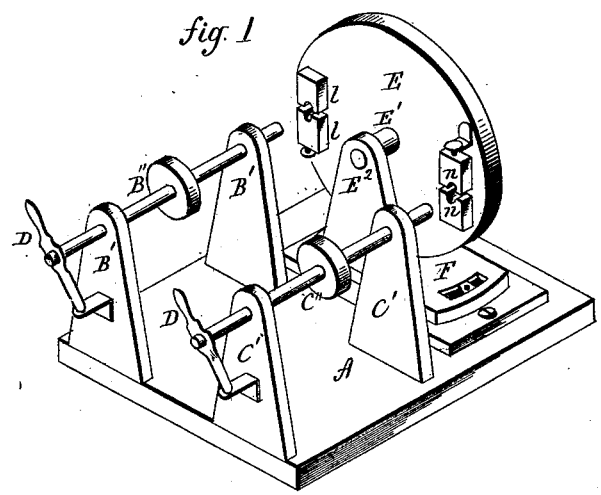
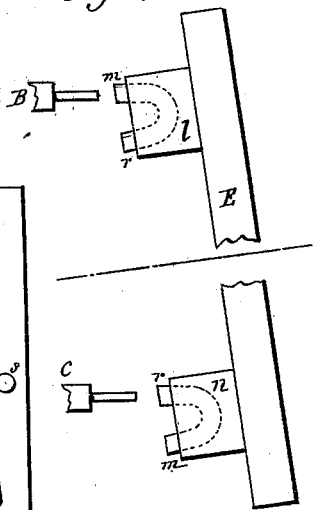
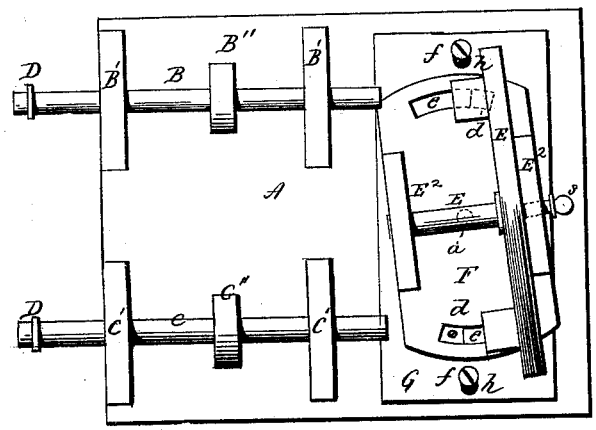
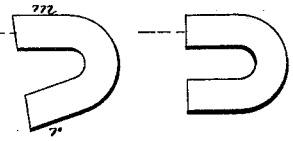
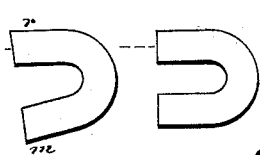
Witnesses.
Thorvald F. Hammer
Inventor
By atty
N. PETERS, PHOTO-LITHOGRAPHER, WASHINGTON, D. C.

UNITED STATES PATENT OFFICE.

THORVALD F. HAMMER, OF BRANFORD, CONNECTICUT.

MACHINE FOR BORING AND TAPPING PIPE-BENDS.

SPECIFICATION forming part of Letters Patent No. 231,312, dated August 17, 1880.

Application filed April 2, 1880. (No model.)

*To all whom it may concern:*

Be it known that I, THORVALD F. HAMMER, of Branford, in the county of New Haven and State of Connecticut, have invented a new Improvement in Machines for Boring and Tapping; and I do hereby declare the following, when taken in connection with the accompanying drawings and the letters of reference marked thereon, to be a full, clear, and exact description of the same, and which said drawings constitute part of this specification, and represent, in—

Figure 1, perspective view; Fig. 2, top view; Figs. 3 and 4, diagrams illustrating the operation; Fig. 5, the face-plate detached and enlarged.

This invention relates to a machine for boring pipe-bends—that is to say, the connections which are used in coils of iron tubing to unite the end of one run with the corresponding end of the next run. The bends are usually of U shape, and made from cast metal. They require to be drilled or tapped, and in the case of horizontal coils the runs of tube must be inclined one to the other, so as to have a regular fall from the upper to the lower coil. In order that water may return to the end it is necessary to drill or tap the two sides of the bends with a corresponding inclination. The invention whereby this object is attained consists in the construction, as hereinafter described, and particularly recited in the claims.

A is the bed, on which two parallel mandrels, B C, are arranged in suitable bearings B' B' C' C'. These mandrels are fitted to carry a drill-tap or screw-cutting tool, as the case may be, and are caused to revolve by the application of power through pulleys B'' C'', or otherwise, and are also fitted with means for forcing them forward to their work, here represented as by means of a lever, D, at the end of each mandrel.

E is the chuck or face-plate, hung upon a shaft, E', supported in suitable bearings E², and so that it may be rotated, as hereinafter described.

The bearing-supports E² are attached to a plate, F, which is arranged upon a transverse sliding plate, G, upon a pivot, a, (denoted in broken lines, Fig. 2,) and so that the plate may be turned on the said pivot to present the face-plate E at different angles to the mandrels, and is secured in position by means of bolts and nuts d, through segment-shaped slots e in the plate F, the said bolts binding firmly the plate F to the plate G.

The plate G is movable to the right and left on the bed A, and is secured by a screw, f, extending through slots h into the bed.

On the side of the face-plate toward the mandrels is a pair of jaws, l l, and, preferably, diametrically opposite is another pair of jaws, n n, constructed and arranged so as to grasp and hold the bend between them. This completes the construction of the machine.

The operation is as follows: Suppose the bend to be drilled or tapped to be such as shown in Fig. 3, in which the two sides are to be tapped at an angle to each other, and that the plate E is arranged at a corresponding angle to the mandrels, as seen in Figs. 2 and 5 enlarged. Place the bend between the jaws l l, so that the outer leg of the bend will come in axial line with the mandrel B, as seen in Fig. 5, and then secure it there. Press the revolving mandrel B, carrying the drill or tap, toward and into that leg m of Fig. 3 which will correspondingly bore or tap that leg. This done, withdraw the mandrel B, turn the plate E one-half around, which will invert the bend, and bring the other leg, r, in a like axial line with the other mandrel, C, as seen in Fig. 5, it being understood that the mandrels are so arranged relative to each other and to the jaws that this position may be attained. The mandrel C is then pressed forward and the other leg, r, of the bend treated accordingly.

The jaws being fitted to properly hold the bend, this operation insures the proper boring or tapping of successive bends and that the same angle of inclination will be given to the different runs of tubing in the coil. The second pair of jaws, n n, enables the placing of one bend in each pair of jaws, so that opposite legs of two bends are being bored or tapped at the same time.

In cases of bends for parallel tubing, as seen in Fig. 4, the plate E is brought into a plane at right angles to the mandrels, so that the two legs of the bend will be bored parallel to each other. (See Fig. 4.)

A set-screw, *s*, or other device, may be used to secure the plate E in its different positions for holding the bends. The jaws on the plate may be adjusted or interchangeable, to adapt the machine to various sizes of work.

I claim—

1. The combination of the rotating plate E, provided with one or more pairs of holding-jaws, with the mandrels B C, each carrying its tool and arranged relative to each other and the holding-jaws on the plate, as described, so that at one point in its revolution one of the mandrels will be in axial line with one leg of the bend to be bored, and at the diametrically-opposite point in the revolution of the plate the other mandrel will be in axial line with the other leg of the bend, substantially as described.

2. The combination of the rotating plate E, provided with one or more pairs of holding-jaws, with the mandrels B C, each carrying its tool and arranged relative to each other and the holding-jaws on the plate, as described, so that at one point in its revolution one of the mandrels will be in axial line with one leg of the bend to be bored, and at the diametrically-opposite point in the revolution of the plate the other mandrel will be in axial line with the other leg of the bend, and the said plate E adjustable to different angles to the mandrels, substantially as described.

3. The combination of the rotating plate E, provided with one or more pairs of holding-jaws, with the mandrels B C, each carrying its tool and arranged relative to each other and the holding-jaws on the plate, as described, so that at one point in its revolution one of the mandrels will be in axial line with one leg of the bend to be bored, and at the diametrically-opposite point in the revolution of the plate the other mandrel will be in axial line with the other leg of the bend, and the said plate E adjustable to different angles to the mandrels and the transverse adjustable plate G, substantially as described.

THORVALD F. HAMMER.

Witnesses:
   JOS. C. EARLE,
   J. H. SHUMWAY.